No. 870,706. PATENTED NOV. 12, 1907.
H. P. WOODARD.
TIDE OR WAVE MOTOR.
APPLICATION FILED FEB. 16, 1906. RENEWED APR. 15, 1907.
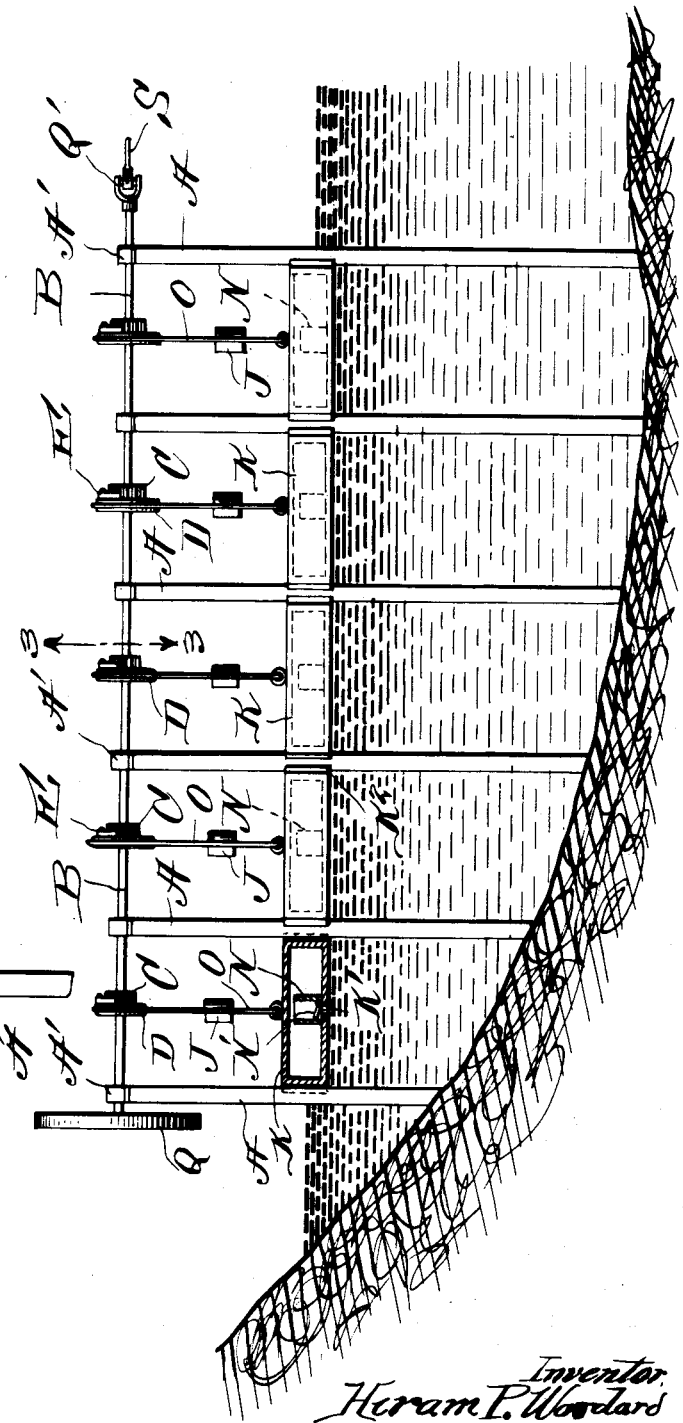

UNITED STATES PATENT OFFICE.

HIRAM P. WOODARD, OF DOUGLAS, ARIZONA TERRITORY.

TIDE OR WAVE MOTOR.

No. 870,706.      Specification of Letters Patent.      Patented Nov. 12, 1907.

Application filed February 16, 1906. Serial No. 301,421. Renewed April 15, 1907. Serial No. 368,247.

*To all whom it may concern:*

Be it known that I, HIRAM P. WOODARD, a citizen of the United States, residing at Douglas, in the county of Cochise, Arizona Territory, have invented certain new and useful Improvements in Tide or Wave Motors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tide or wave power motors, and the object of the invention is to produce a simple and efficient apparatus comprising a series of floats which are adapted, by the rising and lowering of the tide or breakers, to cause a rotary movement to be imparted to a shaft adapted to furnish a source of supply for various purposes.

More specifically, the invention consists of a plurality of floats each of which is hollow and provided with a valve-regulated opening, whereby water may be allowed to enter the float for the purpose of regulating the weight thereof, and in the provision of horizontally disposed shafts to which are keyed ratchet wheels each of which is designed to be driven by a pawl carried upon a grooved pulley about which a cable passes which is fastened to a float, and the opposite end of the cable being secured to a counterbalance weight, whereby as the float is raised by the rising surface of the water, the pawl will turn idly over the teeth of the ratchet wheel, whereas on the lowering of the float, motion will be imparted to the shaft by the dog engaging the teeth of the ratchet wheel.

My invention is illustrated in the accompanying drawings, in which:—

Figure 1 is a side elevation showing a series of floats connected to a horizontally disposed shaft. Fig. 2 is an end elevation, and Fig. 3 is a sectional view on line 3—3 of Fig. 1.

Reference now being had to the details of the drawings by letter, A, A designate a series of piles designed to be driven into the ground underneath the surface of a body of water, and the upper ends of said piles have bearings A' in which is mounted a horizontally disposed power shaft B. Keyed to said power shaft at locations intermediate the several piles are the ratchet wheels C, and loosely journaled upon the shaft adjacent to each ratchet wheel is a grooved pulley D, and pivotally mounted upon one face of each pulley is a dog E designed to engage the teeth of the ratchet wheel C, each dog adapted, as the pulley rotates in one direction, to ride idly over said teeth and to engage the teeth upon the reverse movement of the wheel, thereby tending to rotate the sprocket wheel and the shaft to which it is secured.

K, K designate floats which are hollow and each provided with an opening K' in the bottom thereof, and N, N designate open-ended tubes, the lower ends of which are in registration with the openings K', and a valve N' is positioned at the lower end of each of said tubes and adapted to allow water to enter the tube and fill or partially fill the float.

O, O designate cables which are fastened each to a float, and each cable passes over a pulley D and has a counter-weight J secured to its other end. A suitable balance wheel Q is fixed to said shaft, and power is transmitted from the other end of the shaft by means of the universal shaft Q' with a bar or rod S, whereby the power may be transmitted to other shafts for various purposes. The opposite sides of each float have grooves $K^2$ to receive the edges of the adjacent piles, thereby serving as guides as the floats rise and lower.

The operation of my invention is as follows. The various floats rising and lowering with the surface of the water, will cause a continuous motion to be imparted to the shaft B, the dogs turning idly about the ratchet wheels as the floats rise and engaging the teeth and causing the ratchet wheels to rotate with the pulleys in a reverse direction as the float lowers. By the provision of the valve openings, it will be noted that the floats may be weighted by the introduction of water, if desired, and thereby causing a greater power to be exerted upon the shaft on the downward movement of the float.

What I claim is:—

A tide or wave motor comprising, in combination with a series of outlined piles, parallel to each other, a rotatable shaft supported by said piles, hollow floats which have a valve-regulated opening therein, two of the opposite sides of each float being parallel and provided each with a vertical-angular outlined channel therein, each channel designed to receive a pile; whereby the float may be guided in its vertical movement, an eye fixed through the top of each float, sheaves loosely mounted upon said shaft, a rope fixed to each eye and passing about one of said sheaves, a weight secured to one end of the rope, ratchet wheels fixed to the shaft, a pawl pivoted to each sheave and having its free end designed to engage the ratchet wheel, as set forth.

In testimony whereof I hereunto affix my signature in the presence of two witnesses.

HIRAM P. WOODARD.

Witnesses:
  W. S. DIXON,
  E. A. VON ARNIM.